United States Patent [19]

Oda et al.

[11] Patent Number: 5,028,761
[45] Date of Patent: Jul. 2, 1991

[54] FOOD SERVICE CART WITH A HEATING SYSTEM, AND TRAYS AND CASSEROLES FOR SUCH A FOOD SERVICE CART

[75] Inventors: Yutaka Oda, Kanagawa; Yasushi Murakami, Tokyo, both of Japan

[73] Assignee: Jamco Corporation, Tokyo, Japan

[21] Appl. No.: 501,561

[22] Filed: Mar. 30, 1990

[30] Foreign Application Priority Data

Aug. 15, 1989 [JP] Japan .................. 1-210500

[51] Int. Cl.[5] .................. F24C 7/10; F25B 29/00; H05B 3/68
[52] U.S. Cl. .................. 219/386; 165/919
[58] Field of Search .............. 219/385, 386, 387, 521; 165/918, 919

[56] References Cited

U.S. PATENT DOCUMENTS

| 4,093,041 | 6/1978 | Davis | 219/386 |
|---|---|---|---|
| 4,103,736 | 8/1978 | Colato | 219/521 |
| 4,180,125 | 12/1979 | Schultz et al. | 219/386 |
| 4,203,486 | 5/1980 | Rubbright | 219/386 |
| 4,346,756 | 8/1982 | Dodd et al. | 219/386 |

FOREIGN PATENT DOCUMENTS 1423691 11/1965 France .................. 219/385

OTHER PUBLICATIONS

"The 3M Food Service System", Brochure, ©Sept. 1987.

*Primary Examiner*—Teresa J. Walberg
*Attorney, Agent, or Firm*—Armstrong, Nikaido, Marmelstein, Kubovcik & Murray

[57] ABSTRACT

A heating system heats casseroles placed on trays on a passenger plane. The heating system includes heating plates vertically arranged at regular intervals to receive the casseroles between adjacent heating plates to heat each casserole from above and from beneath. The heating plate includes a ceramic plate, a heating element buried in the ceramic plate, electrodes projecting from the ceramic plate, and a reinforcing frame. The heating plate is attached to the inner surface of a side wall of a cabinet. The junction of the heating plate and the side wall is sealed in a water-tight manner. The heating system is connected to a power supply by connecting a receptacle connector fixedly provided on the cabinet, and a plug connector elastically supported on a fixed part of the galley of the passenger airplane so as to be vertically, horizontally and axially movable. When the receptacle connector is pressed against the plug connector, the plug connector is brought automatically into alignment with the receptacle connector. A tray is provided with a partition rib partitioning off a part of the surface of the tray to make a heating portion for receiving a casserole thereon. The casserole is surrounded closely by the partition rib and portions of a peripheral rib so that the heat of the casserole is not released outside. A casserole has a pan and a top formed of a heat-transmissive, transparent plastic.

14 Claims, 6 Drawing Sheets

FOOD SERVICE CART WITH A HEATING SYSTEM, AND TRAYS AND CASSEROLES FOR SUCH A FOOD SERVICE CART

FIELD OF THE INVENTION

The present invention relates to a food service cart with a heating system, and trays and casseroles for the food service cart for serving food on an airplane with passengers.

DESCRIPTION OF THE PRIOR ART

On a passenger airplane, trays holding food are passed to passengers during an inflight meal. The trays, with the food, are put into a food service cart on the ground, and the food service cart carries the trays with the food to the passengers for the inflight meal.

In most cases, cooked cold food is arranged on the trays on the ground. Individual casseroles containing the entree, such as fish or meat dishes, are arranged on a rack. The rack in turn is stored in an onboard oven. The casseroles are transferred from the rack to trays after being heated in the oven. The trays holding the cold items and the heated casseroles are then delivered to the passengers. Heating the casseroles in the oven and transferring them from the oven to the trays mounted on the food service cart before serving is time consuming work, particularly on large passenger planes. Attempts have recently been made to store trays holding both cold and hot items in a refrigerated food service cart and to heat or warm only the hot items in the refrigerated atmosphere.

U.S. Pat. Nos. 4,180,125 and 4,346,756 disclose systems of heating food containers with heaters. The heaters are provided respectively between the food containers, containing hot food and trays holding the food containers, in order to heat or to keep the hot food in the food containers warm. However, the trays and cold food, as well as hot food, are heated by heat conduction. Therefore, circulation of cool air cooled by dry ice or by an external refrigerating apparatus through the food service cart is necessary to keep the cold food cold. However, the circulation of cool air reduces the heating effect and extends the time necessary for heating the hot food to a predetermined temperature.

Furthermore, since the heaters must be thin, it is difficult to perfectly insulate the heaters. Imperfectly insulated heaters can be damaged when the interior of the food service cart is washed with water or it is impossible to wash the interior of the food service cart to avoid damaging the heaters.

A system using trays with individual built-in heaters has been proposed. However, such a tray has would have a large height and an increased weight and would be inconvenient to handle. Furthermore, such a tray requires a complicated power feeding unit for feeding power to the built-in heater of the tray. It would be difficult to prevent the connectors from getting wet when the tray is washed. Since the heater is placed in contact with the bottom surface of the casserole, in some cases the upper portion of the hot food contained in the casserole would not be heated.

All food service carts equipped with a heating system, regardless of type and without exception, need a connector for receiving power. Connecting the connector of a feed cable to the connector of the food service cart requires additional work. It is desirable that the connector of the food service cart is connected to a connector provided in the galley of the passenger plane simply by pushing the food service cart into a predetermined place. However, it is difficult to place the food service cart so that the connector thereof is aligned with that of the galley.

SUMMARY OF THE INVENTION

Accordingly, it is an object of the present invention to provide a food service cart provided with a heating system which is capable of heating casseroles from above and below to satisfactorily and entirely heat hot food contained in the casseroles, and to facilitating washing the interior thereof.

It is another object of the present invention to provide trays and casseroles for such a food service cart.

It is a further object the present invention to provide a power feed connector to be provided in the galley of airplane or the like, capable of moving axially, vertically and horizontally, and capable of being automatically aligned with the power receiving connector of a feed service cart.

To achieve the objects, the present invention provides a food service cart comprising a cabinet having the shape of a rectangular parallelepiped having front and rear doors, and side walls each provided on the inner surface thereof with a vertical arrangement of a plurality of tray guide members for supporting and guiding trays. A heating system comprises a plurality of heating units each comprising heating plates capable of radiating heat rays from both sides thereof and attached to the inner surface of the side wall of the cabinet so as to be disposed opposite to and between casseroles mounted on trays supported on the tray guide members. A receptacle connector receives a movable plug connector provided in a galley and is connected to a power supply to feed electric power to the heating system.

A tray to be put in the cabinet of the food service cart is provided with peripheral ribs which rests on the tray guide members provided on the inner surfaces of the side walls. A partition rib partitions off a part of the surface to make a heating portion for receiving a casserole. The partition rib is provided with ventilating openings in the upper wall thereof.

A casserole to be placed in the heating portion of the tray comprises a pan having a shape conforming to the heating portion of the tray, and a top formed of a transparent plastic having a high heat ray transmissivity.

When the tray holding the casserole containing a hot food item is inserted in the cabinet of the food service cart along the tray guide members, the casserole is disposed between the heating plates. The plug connector of the galley is plugged in the receptacle connector of the food service cart to heat the heating plates, so that the hot food is heated both from above and from below the casserole. The ventilating openings of the partition rib allow hot air heated by the heated heating portion of the tray to flow therethrough into the to of the casserole to prevent the flow of hot air toward portions of the tray other than the heating portion.

The axially, vertically and horizontally movable power feed plug connector of the galley can be plugged in the receptacle connector of the food service cart regardless of the vertical and/or horizontal displacement of the receptacle connector from the correct position with respect to the plug connector and/or the distance between the plug connector and the receptacle connector.

BRIEF DESCRIPTION OF THE DRAWINGS

The above and other objects, features and advantages of the present invention will become more apparent from the following description taken in conjunction with the accompanying drawings, in which.

DETAILED DESCRIPTION OF THE PREFERRED EMBODIMENTS

Figure 1:
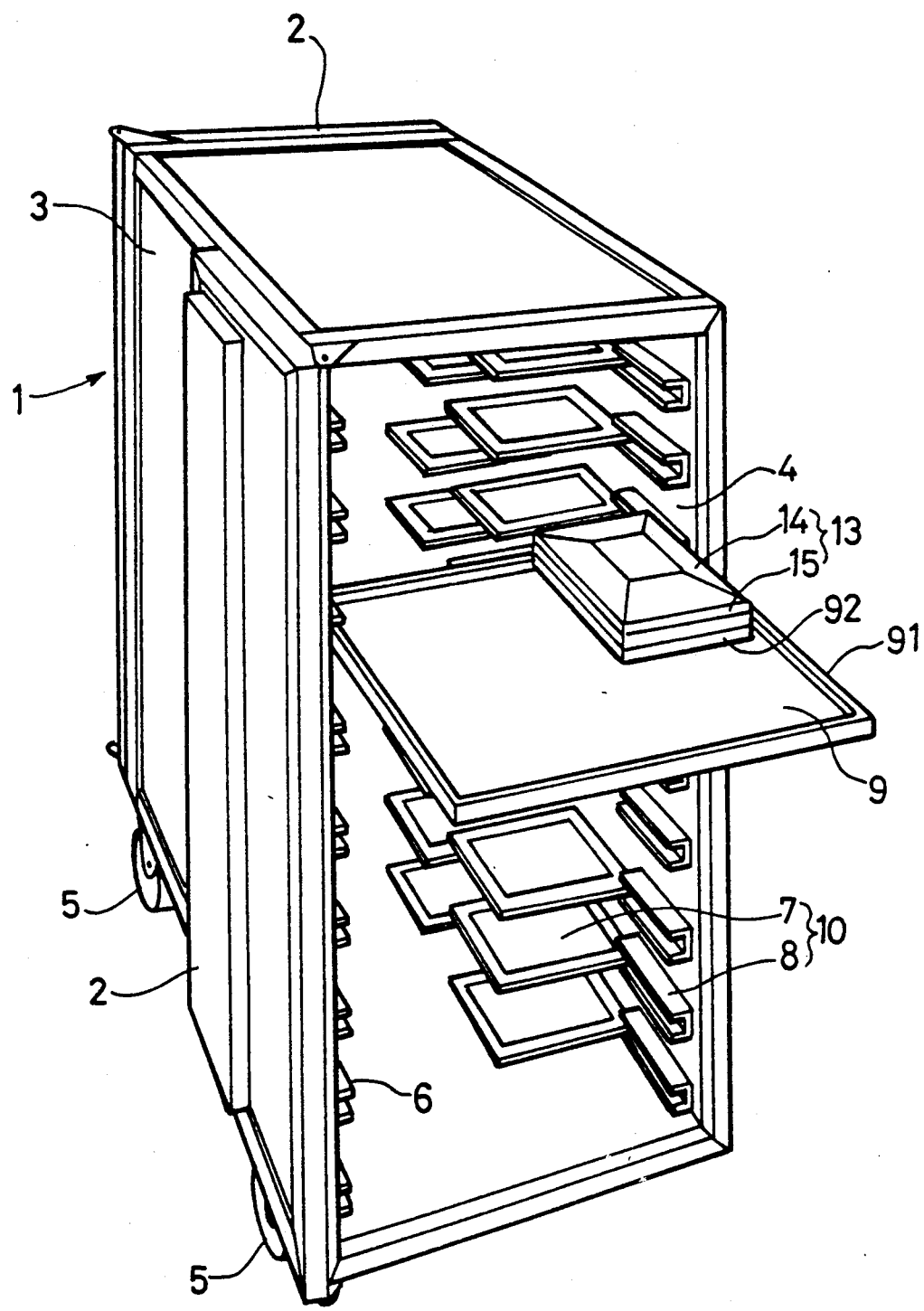
FIG. 1 is a perspective view of a food service cart with a heating system in a preferred embodiment according to the present invention.
Figure 2:
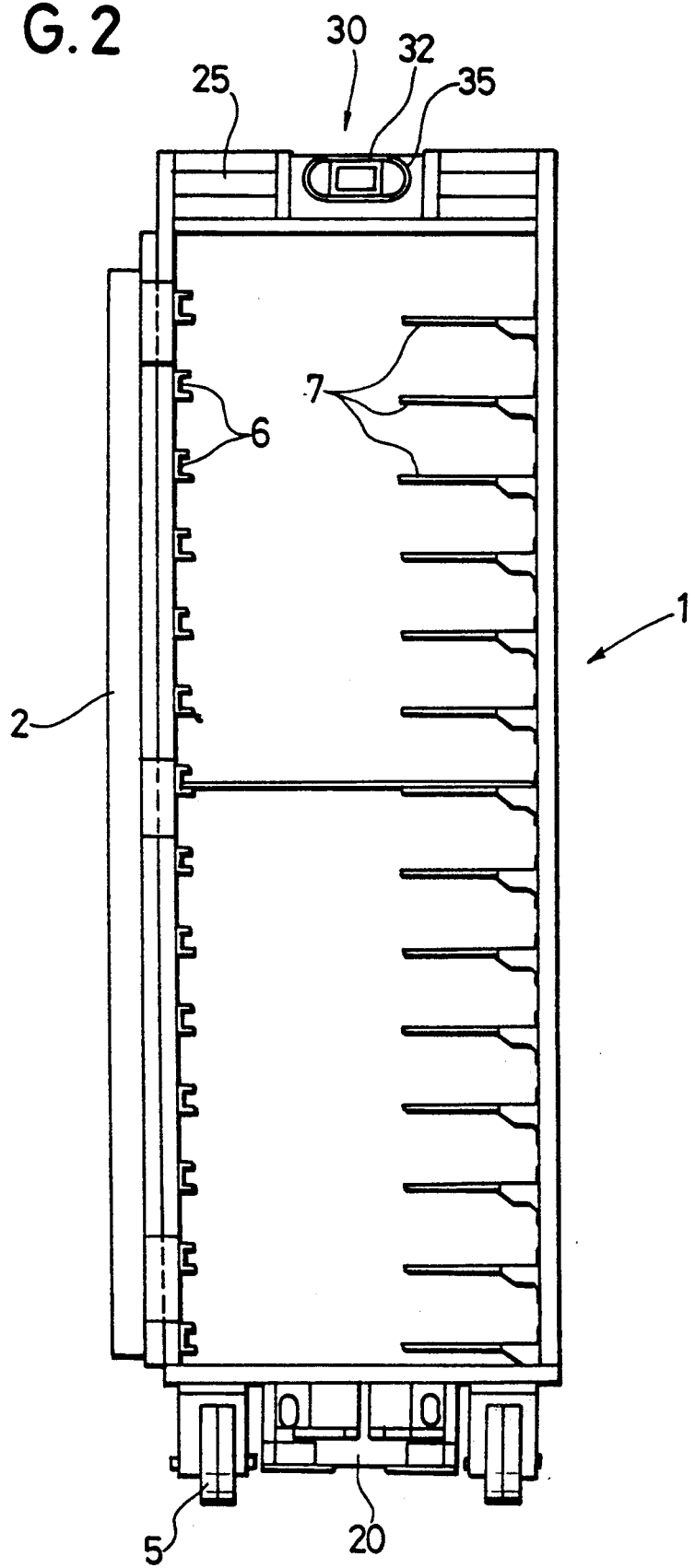
FIG. 2 is a rear view of the food service cart of FIG. 1.
Figure 3:
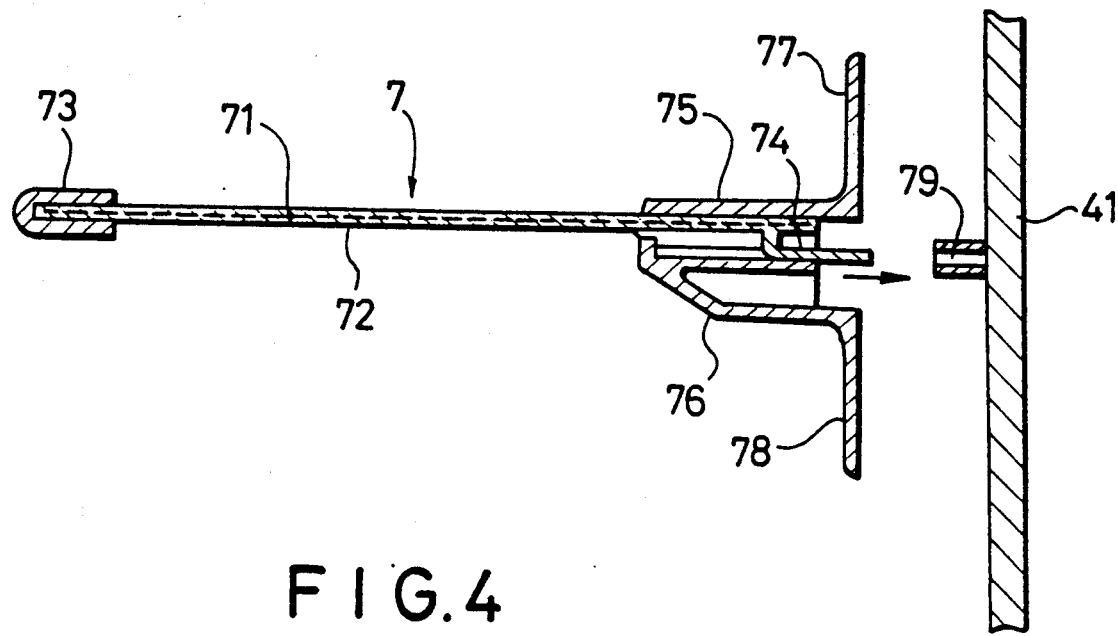
FIG. 3 is a sectional view of a heating plate unit of the heating system of the food service cart of FIG. 1.

Referring to FIGS. 1 and 2, a food service cart embodying the present invention comprises a rectangular parallelepiped cabinet 1 having front and rear single swing doors 2 and side walls 3 and 4. Casters 5 are attached to the bottom wall of the cabinet 1. An anchoring device 20 is attached to the bottom wall of the cabinet 1 to anchor the food service cart to the floor. A handle 25 is attached to the top wall of the cabinet 1. A receptacle connector 30 is provided on the top wall of the cabinet 1. A heating system and a dry ice container are provided but not shown. The components of the cabinet 1 are formed of a synthetic resin or the like to minimize the weight of the cabinet 1. Tray guide members 6, having a cross-section resembling the letter U, are attached to the inner surface of the side wall 3 in a vertical arrangement at regular intervals. The opposite side wall 4 comprises a base board formed of a synthetic resin, and a printed wiring board 41 (FIG. 3). Tray support units 10, each including a heating plate 7 and a tray guide rail 8, are attached to the inner surface of the side wall 4 in a vertical arrangement at regular intervals so as to correspond, respectively, to the tray guide rails 6 attached to the side wall 3.

The heating plates 7 are also the components of the heating system. The heating system comprises two or three heating units each comprising a plurality of the heating plates 7. The heating units are arranged longitudinally of the cabinet 1 as shown in FIG. 1. Each heating unit includes, for example, fifteen heating plates 7 to contain fourteen trays in the cabinet 1. Therefore, the heating system includes thirty to forty-five heating plates 7. The heating plate 7 comprises a reinforcing frame 73, a ceramic plate 72 framed in the reinforcing frame 73, and a heating element 71 buried in the ceramic plate 72. The reinforcing frames 73 are formed of a highly heat resistant, insulating hard plastic. The heating plate 7, reinforced by the reinforcing frame 73, withstands the weight of the tray 9 including food containers and food contained in the food containers and holds the tray in a horizontal position. The gap between the ceramic plate 72 and the reinforcing frame 73 is perfectly sealed. Since the heating element 71 is perfectly sealed in the highly abrasion-resistant ceramic plate 72 and is perfectly isolated from the atmosphere, the heating plate 7 is washable and has a long service life.

Referring to FIG. 3, two pin electrodes 74 project from one end of the lower surface of the ceramic plate 72. The heating plate 7 radiates heat from both major surfaces. The heating plate 7 is held in a cantilever fashion between an upper support 75 and a lower support 76. The respective vertical flanges 77 and 78 of the upper support 76 and the lower support 76 are bolted to the inner surface of the side wall 4. The pin electrodes 74 are received in a receptacle connector 79 connected to the circuit of the printed wiring board 41 to supply electricity to the heating element 71 when the heating plate 7 is inserted between the upper support 75 and the lower support 76. The side wall 4 may be a printed wiring board. The heating plates 7 and the tray guide rails 8 are arranged alternately longitudinally of the cabinet 1. The trays 9 holding food containers including the casseroles are supported on the tray guide rails 6, and the tray support units 10, each including the heating plate 7 and the tray guide rail 8, in the cabinet 1.

Figure 4:
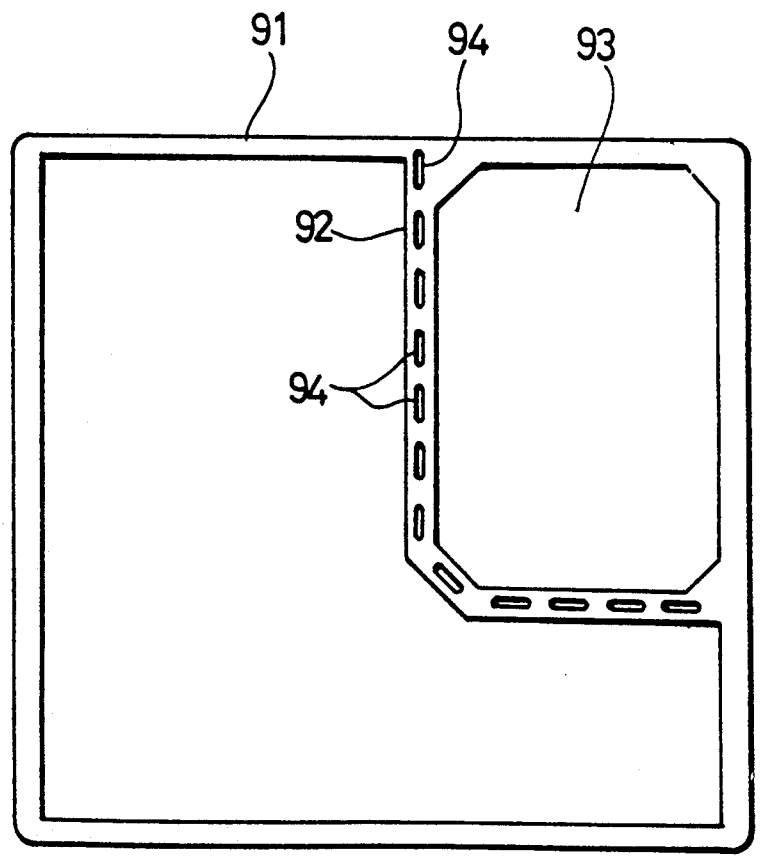
FIG. 4 is a plan view of a tray embodying the present invention.

The tray 9 is formed of a heat-resistant synthetic resin, such as a polyesterimide or a polyacrylsulfone, by injection molding. As shown in FIG. 4, the tray has a generally rectangular shape, and has a peripheral rib 91 having a cross section resembling the inverted letter U, and a partition rib 92 having a cross section resembling the inverted letter U and formed in an L-shape to partition a part of the surface to make a heating portion 93 for receiving a casserole thereon. A plurality of ventilating openings 94 are formed in the horizontal wall of the partition rib 92. When the tray 9 is inserted in the cabinet 1, the opposite side portions of the peripheral rib 91 of the tray 9 rest, respectively on the tray guide rail 6 and the tray support units 10. When the tray 9 is placed correctly in the cabinet 1, the heating portion 93 is located on the heating plate 7.

Figure 5:
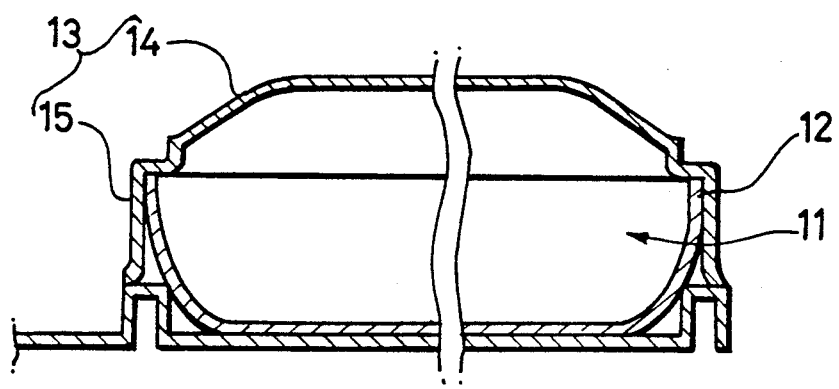
FIG. 5 is a sectional view of a casserole embodying the presen invention.
Figure 6:
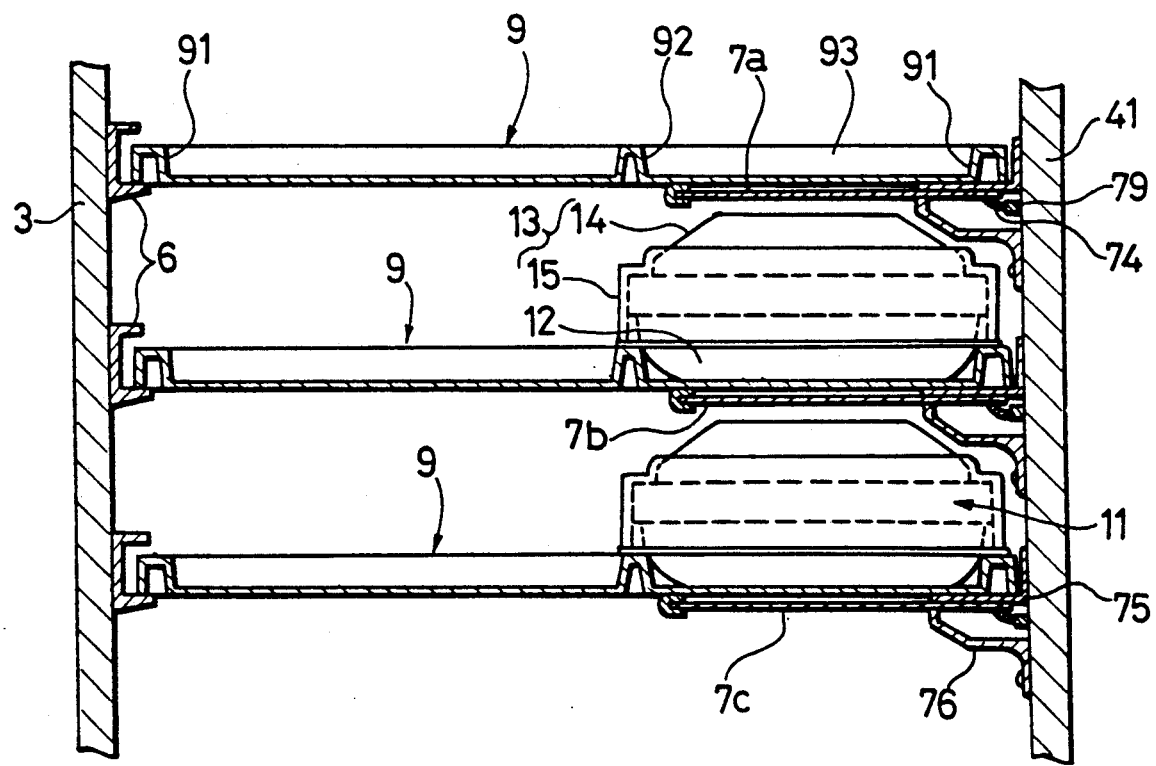
FIG. 6 is a fragmentary sectional view of the food service cart of FIG. 1 storing trays and casseroles.
Figure 7:
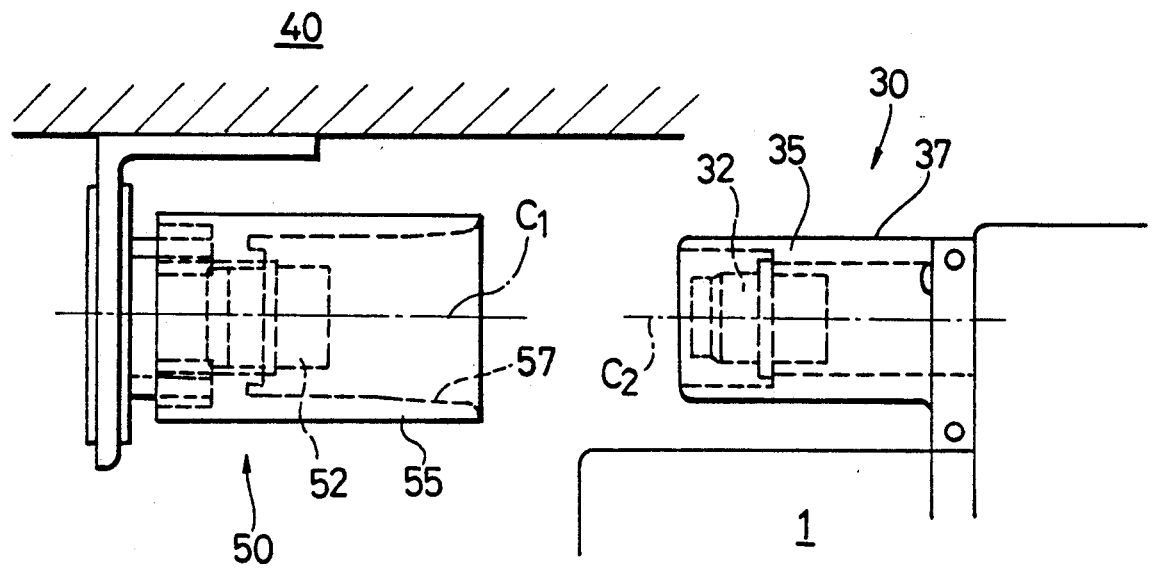
FIG. 7 is an illustration of assistance in explaining a connecting device.

Referring to FIG. 5, a casserole 11 to be placed in the heating portion 93 of the tray 9 comprises a pan 12 and a top 13 for covering the pan 12. The pan 12 is formed of a heat-resistant ceramic, heat-resistant china or a heat-resistant plastic in a shape conforming to the heating portion 93. The top 13 is a lightweight covering member formed of a transparent plastic having a high heat ray transmissivity. The top 13 has a top wall 14 for covering the pan 12, and a skirt 15 closely surrounding the brim of the pan 12. When the casserole 11 is placed in the heating portion 93 of the tray 9, the edge of the skirt 15 is in contact with the respective upper surfaces of the side portion of the peripheral rib 91 and the partition rib 92, with the periphery of the top wall 14 in close contact with the upper edge of the pan 12.

When electricity is supplied to the heating plate 7 to heat the casserole 11 placed on the tray 9, the heating plate 7b under the tray 9 heats the bottom wall of the pan 12, and the heating plate 7a over the casserole 11 heats the casserole 11 from above. The top 13, having the skirt 15 surrounding the side surface of the pan 12, prevents the propagation of heat from the pan 12. The ventilating openings 94 of the partition rib 92 prevents the transfer of heat of the heating plate to portions of the tray 9 other than the heating portion 93.

Referring to FIGS. 7 to 10, a connecting device comprises the receptacle connector 30 provided on the food service cart 1, and a plug connector 50 provided on a fixed part 40 of the galley. The plug connector 50 has a tubular plug case 55 and a plug 52 provided coaxially within the plug case 55. The receptacle connector 30 has a receptacle case 35 and a receptacle 32 provided coaxially within the receptacle case 35.

The receptacle 32 is connected to the electric circuit of the printed wiring board 41 of the side wall 4. When the plug 52 is plugged in the receptacle 32, the plug case 55 fits into the receptacle case 35 of the plug connector 50 as shown in FIG. 8.

The center axis $C_1$ of the plug 52 and the center axis $C_2$ of the receptacle 32 coincide with each other. However, the center axes $C_1$ and $C_2$ do not always coincide with each other because of dimensional errors in the food service cart or the abrasion of the casters 5. The plug connector 50, provided on the fixed part 40 of the galley, is of a self-aligning type capable of automatically coming into alignment with the receptacle connector 30 of the food service cart 1.

Figure 8:
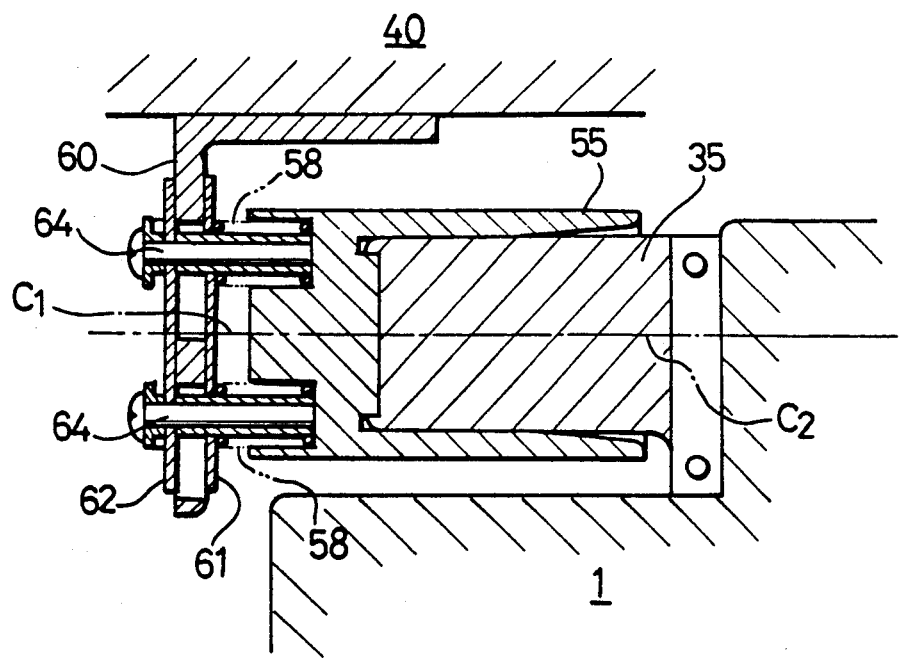
FIG. 8 is a sectional view of the connecting device of FIG. 7.
Figure 9:
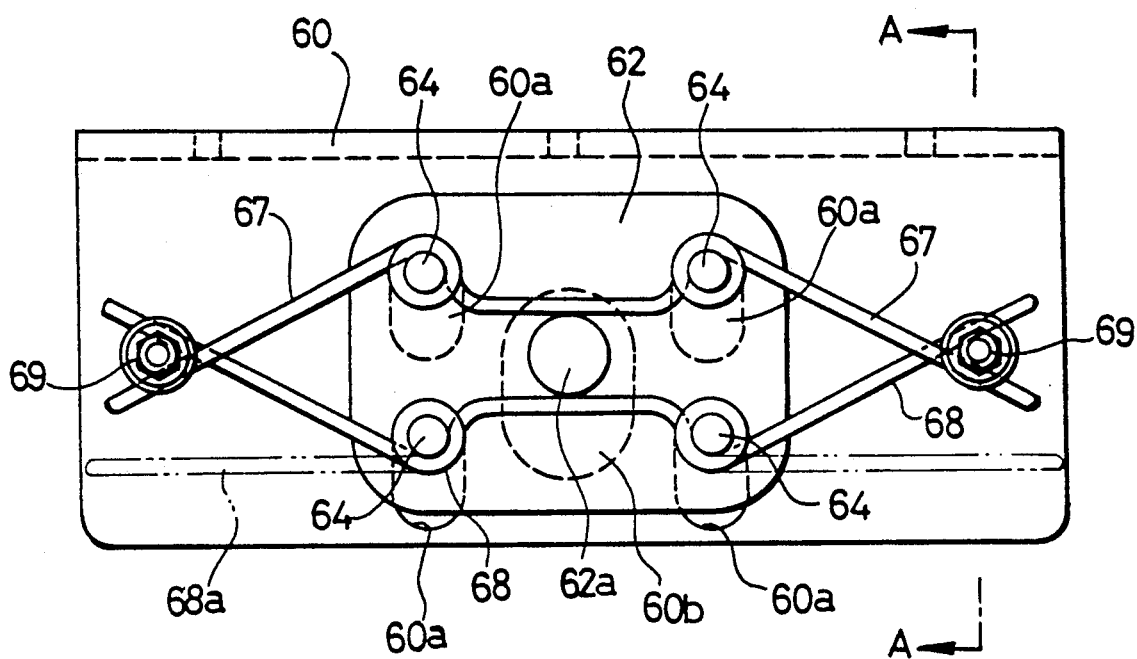
FIG. 9 is a rear view of the plug connector of the connecting device of FIG. 7.
Figure 10:
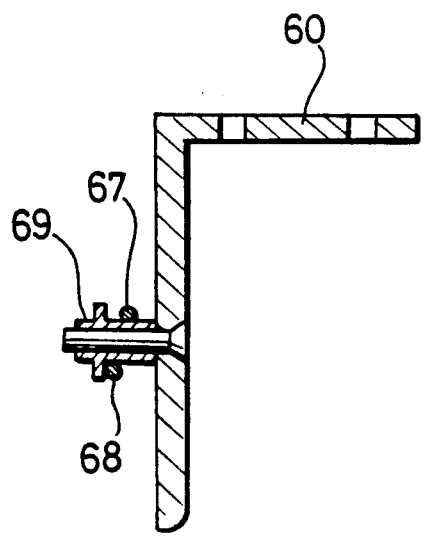
FIG. 10 is a sectional view taken on line A—A in FIG. 9.

Referring to FIGS. 8, 9 and 10, the plug connector 50 is supported on a bracket 60 attached to the fixed part 40 of the galley. Two bolts 69 are fastened to the bracket 60 respectively at the opposite ends of the same. A central slot 60b is formed in the central portion of the bracket 60. Four slots 60a are formed in the bracket 60 around the central slot 60b. Two plates 61 and 62, each having four holes corresponding to the four slots 60a, are put, respectively, on the opposite surfaces of the bracket 60. Four bolts 64 are passed through the four holes of the plates 61, the four slots 60a of the bracket 60 and the four holes of the plate 62 to support the plug case 55 of the plug connector 50. Four compression springs 58 are mounted, respectively, on the four bolts 64 to bias the plug case 55 away from the bracket 60. Two springs 67 and 68 are strained between the two bolts 69 as shown in FIG. 9 so as to hold the two plates 61 and 62 and the plug case 55 elastically at a neutral position. In a free state, the opposite ends of the spring 68 extend as shown by alternate long and two short dashes lines in FIG. 9. The same is the case with the spring 67. Thus, the plug case 55 can elastically be moved in vertical and horizontal directions by an external force as seen in FIG. 9. A circular hole 62a is formed in the central portion of the plate 62. A circular hole is formed in the central portion of the plate 61. A cable connected to the plug 52 is extended through the circular holes of the plates 61 and 62 and the central slot 60b of the bracket 60.

When the food service cart 1 is pushed into a predetermined place in the galley, the receptacle case 35 is pushed into the plug case 55 to bring the center axis $C_1$ of the plug case 55 forcibly and automatically into alignment with the center axis $C_2$ of the receptacle case 35.

Thus, the positional flexibility of the plug connector 50 enables the use of the food service cart 1 on different passenger airplanes of the same type regardless of the variation of the position of the receptacle connector 30 of the food service cart 1 relative to the plug connectors 50 of the different passenger airplanes.

When the trays holding food containers containing cold food and the casseroles containing hot food are placed in the cabinet of the food service cart, the hot food contained in each casserole is heated from above and from beneath the casserole, so that the hot food are uniformly heated. Since the heating portion of the tray for receiving the casserole is separated by the partition rib from the other portion of the tray, the casserole can simply and correctly be located between the corresponding heating plates. The partition rib and the ventilating holes of the tray prevent heat transfer from the heating portion of the tray to the other portion of the tray, so that the cold food is not heated.

The heat-transmissive top of the casserole enables the effective use of the heating plate over the casserole, so that the contents of the casserole can rapidly be heated. Since the skirt of the top is in close contact with the respective upper surfaces of the partition rib and a portion of the peripheral rib, the heat in the casserole is not released outside.

The receptacle connector of the food service cart can be connected to the plug connector simply by pushing the food service cart in a predetermined place in the galley because the plug connector comes automatically into alignment with the receptacle connector.

Since the heating element of the heating plate is sealed and perfectly insulated in the ceramic plate, the interior of the cabinet of the food service cart can be washed with water to maintain the interior of the cabinet sanitary and clean.

From the foregoing description of the preferred embodiment of the invention, it will be apparent that many modifications may be made therein. It should be understood that these embodiments are intended as one example of the invention only, and that the invention is not limited thereto. Therefore, it should be understood that the appended claims are intended to cover all modifications that fall within the true spirit and scope of the invention.

What is claimed is:

1. A heating system of restoring a plurality of trays holding food, food containers, casseroles and eating utensils, said heating system comprising:
   a rectangular parallelepiped cabinet having opposite side walls, a top wall, a bottom wall, a front door and rear door;
   a plurality of tray guide rails attached to respective inner surfaces of opposite side walls in a vertical arrangement;
   a printed wiring board attached to the inner surface of one of the opposite side walls; and
   a plurality of heating units each including a plurality of heating plates attached at one side thereof to the printed wiring board, each heating plate capable of radiating heat from opposite major surfaces thereof, said heating plates are arranged vertically at regular intervals on the printed wiring board so that the casseroles hold on the trays are located respectively, between adjacently located heating plates when the trays are located on the gray guide rails in the cabinet.

2. A heating system according to claim 1, wherein each heating plate comprises a ceramic plate, an electric heating element buried in the ceramic plate, a frame formed of a hard plastic and attached to a periphery of the ceramic plate, and electrodes projecting from the ceramic plate, the electrodes are connected to a receptacle of the printed wiring board in a sealed space, and the heating plates are held in a cantilever fashion.

3. A heating system according to claim 2 wherein said heating plate is held in a cantilever fashion between an upper support and a lower support, said upper and lower supports having respective vertical flanges which are attached to the inner surface of the side wall containing the printed wiring board.

4. A heating system according to claim 2 wherein said ceramic plate and said frame are connected together pair and water-tightly.

5. A heating system according to claim 1, further comprising a plug connector for electrically connecting said cabinet to a power supply, said plug connector comprising a tubular plug case and a plug provided coaxially within the tubular plug case, an inner surface of the tubular plug case has a shape capable of guiding a receptacle case of a receptacle connector fixedly provided on the cabinet, and conforming to an external shape of the receptacle case, and the tubular plug case is supported elastically so as to the vertically, horizontally and axially movable.

6. A heating system according to claim 5 wherein said plug connector is supported by support means comprising a) bracket attached to a fixed position, said bracket including a center slot and a plurality of slots surrounding the center slot, b) first and second plates placed on opposite surfaces of the bracket, each having holes corresponding to said slots surrounding the center slot, c) a plurality of bolts, each mounted through one of said plurality of holes and correspond slots and d) a plurality of springs, each mounted on a bolt for bracing said plug case away from said bracket and for elastically moving said lug case axially, vertically and horizontally.

7. A heating system according to claim 1 further comprising a tray for use in combination with said cabinet, said tray having a rectangular shape in a plan view, and having a peripheral rib standing up from a periphery, and said tray having a partition rib partitioning off a part of a surface of the tray to make a heating portion for receiving a casserole thereon and said partition rib provided with ventilating openings arranged at suitable intervals in a upper wall thereof.

8. A heating system according to claim 7 wherein said casserole comprising a pan having a shape conforming to that of the heating portion of the tray, and a top for covering the pan, the top is formed of a transparent plastic having a high heat transmissivity.

9. A heating system according to claim 8 wherien said top has a skirt surrounding side surfaces of the pan and extending to contact said partition rib when said casserole is on aid heating portion of said tray.

10. A heating system according to claim 7 wherein said partition rib has an inverted U-shape in cross section.

11. A heating system according to claim 7 wherein said partition rib is formed in an L-shape to partition the part of the surface of the tray.

12. A heating system according to claim 1 wherein casseroles held on the trays are heated on top and bottom surfaces by vertically adjacent heating plates.

13. A heating system according to claim 1 wherein pairs of said tray guide rails support respective trays inside said cabinet.

14. A heating system according to claim 1 wherein each heating plate partially extends into an interior of said cabinet.

* * * * *